United States Patent

[11] 3,602,732

[72] Inventor Yasoji Suzuki
Kawasaki-shi, Japan

[21] Appl. No. 850,946
[22] Filed Aug. 18, 1969
[45] Patented Aug. 31, 1971
[73] Assignee Tokyo Shiboura Electric Co., Ltd.
Kawasaki-shi, Japan
[32] Priority Aug. 20, 1968
[33] Japan
[31] 43/59052

[54] EXCLUSIVE AND/OR CIRCUIT DEVICE
5 Claims, 2 Drawing Figs.

[52] U.S. Cl. .......... 307/205,
307/216, 307/304
[51] Int. Cl. .......... H03k 19/08
[50] Field of Search .......... 307/205,
216, 218, 251, 279, 304

[56] References Cited
UNITED STATES PATENTS

| | | | |
|---|---|---|---|
| 3,017,523 | 1/1962 | Harris .......... | 307/216 |
| 3,238,379 | 3/1966 | Clarke .......... | 307/216 |
| 3,309,534 | 3/1967 | Yu et al. .......... | 307/304 X |
| 3,390,382 | 6/1968 | Igarashi .......... | 307/279 X |

*Primary Examiner*—Stanley T. Krawczewicz
*Attorney*—Flynn & Frishauf

ABSTRACT: An exclusive AND/OR circuit device comprising an exclusive AND/OR circuit element which is formed of a pair of first and second field-effect transistors having substantially the same properties; the source of one of said transistors being connected to the gate of the other; another pair of third and fourth field-effect transistors whose sources are grounded; the drains of the latter transistors being connected to the input terminal of said exclusive AND/OR circuit element and also to a power source through load elements respectively.

Figure 1:
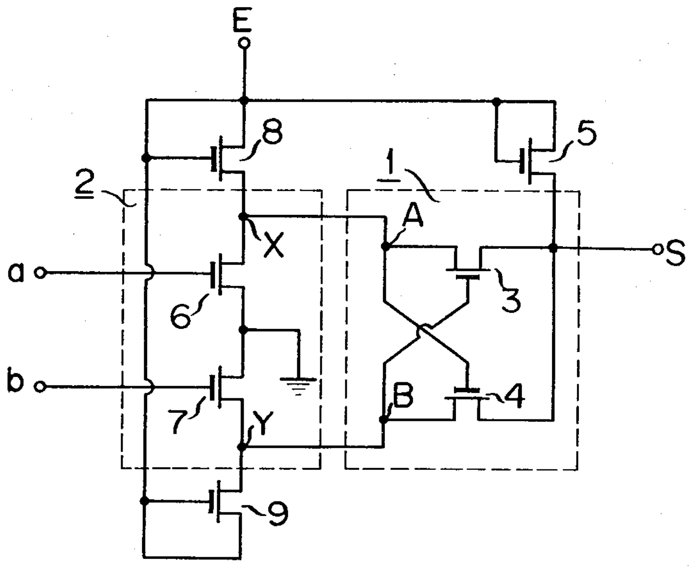

YASOJI SUZUKI,
INVENTOR.
BY Flynn & Frishauf
Attys

EXCLUSIVE AND/OR CIRCUIT DEVICE

The present invention relates to improvements in an exclusive AND/OR circuit using field-effect transistors.

Said circuit is otherwise known as an exclusive logical circuit. The one used in recent years is prepared from a pair of metal-oxide-semiconductor (MOS) field-effect transistors having substantially the same properties. In this case the sources of each of the transistors is connected to the gate of the other and the sources of said transistors are supplied with input signals in such a manner as to allow output signals to be taken out of the common contact of the drains. An exclusive logical circuit, for example, an exclusive OR circuit operates in such a manner that where two input signals supplied to the two sources assume the same polarity, the polarity of output signals has a level of "0," and where said input signals bear opposite polarities, the polarity of output signals has a level of "1." In other words, when the polarity levels of both input signals have the form of "0, 0" or "1, 1," then the resultant output will have a level of "0" and when said polarity levels have the form of either "0, 1" or "1, 0," then the resultant output will have a level of "1." With the two inputs designated as *A* and *B* respectively and the output as *S*, said exclusive OR logic may be expressed by the following equation.

$$S=A\bar{B}+\bar{A}B \quad (1)$$

On the aforementioned premise, the logic of the exclusive AND circuit may be expressed by the following equation simply by reversing the polarity of inputs introduced into said circuit.

$$S=\bar{A}\bar{B}+AB \quad (2)$$

The logical operation circuit used in an addition and subtraction device or the like often involves a substantial number of logical elements which may be represented by the aforementioned equations. If, therefore, such an exclusive AND/OR circuit is used in setting up, for example, an addition and subtraction device, then the entire circuit arrangement of such device will become relatively simple, because the exclusive AND/OR circuit itself is of very simple arrangement.

However, the prior art exclusive AND/OR circuit presents difficulties in use because of the undermentioned drawbacks.

Generally, an MOS field-effect transistor has a relatively high output impedance (impedance across the drain and source) when it is turned on, so that it is characterized by a high turn-on voltage. Thus, the output voltage *V*out of the prior art circuit, when turned on, assumes a value equal to a sum of the input voltage *V*in and the voltage drop *v*z occurring across the drain and source of the MOS field-effect transistor. Said output voltage *V*out may be expressed as follows:

$$V\text{out} = V\text{in} + V\text{z} \quad (3)$$

Accordingly, if it is assumed, for example, that the input voltage *V*in is −2V and the voltage drop across the drain and source of the MOS field-effect transistor is −2V, then the output voltage *V*out will be −4V. If, in this case, said transistor is set to have a threshold voltage of −4V, then there will be most likely actuated the gate element of another MOS field-effect transistor used in the succeeding exclusive AND/OR circuit.

It is accordingly an object of the present invention to eliminate the drawbacks encountered with the prior art device and provide an exclusive AND/OR circuit of simple arrangement using field-effect transistors, wherein the transconductance of said transistors is not increased with the resultant decrease in the area occupied by the elements used, the elements connected to the output stage of the transistors are allowed to have substantially the same threshold voltage to permit their integration, even if said field-effect transistors are connected in a manner to form a plurality of stages, the input and output voltages can have a certain optimum value, and moreover there is little required any extra operating input current.

Another object of the invention is to provide an exclusive AND/OR circuit wherein the output voltage therefrom has an optimum level, so that the elements connected to the succeeding stage are least likely to act erroneously.

Figure 2:
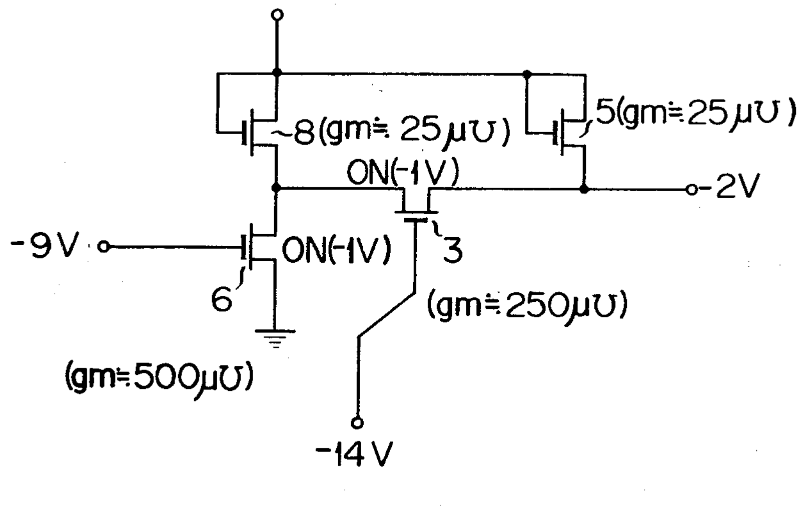

This invention can be more fully understood from the following detailed description when taken in connection with reference to the accompanying drawing, in which;

FIG. 1 presents the arrangement of an exclusive AND/OR circuit according to an embodiment of the present invention; and FIG. 2 is a rearranged diagram of part of said circuit by way of illustrating its operation.

There will now be described the present invention by reference to the indicated embodiment. FIG. 1 represents an exclusive AND/OR circuit according to an embodiment of the invention. Numeral 1 denotes an exclusive AND/OR circuit element of the known arrangement and numeral 2 an inverter circuit which includes two inverters and which is connected to the input terminal of said element 1. This exclusive AND/OR circuit element 1 comprises two MOS field-effect transistors 3 and 4 of P channel type, for instance, the gates and sources of which are respectively connected to each other, their contacts forming input terminals A and B, and the drains of which are connected to each other to form an output terminal S, and another MOS field-effect transistor 5 interposed between the output terminal S and power source terminal E so as to act as a load element.

On the other hand, the inverter circuit 2 comprises a pair of MOS field-effect transistors 6 and 7 whose sources are connected together and grounded and whose drains are connected to the power source E through other load MOS field-effect transistors 8 and 9. The gates of the former MOS field-effect transistors 6 and 7 form signal input terminals *a* and *b* and the drains thereof form signal output terminals X and Y, which are connected to the input terminals A and B of the exclusive AND/OR circuit 1.

Now let it be assumed that the aforementioned MOS field-effect transistors thus connected have an equal threshold voltage of, for example, −4V so as to permit integration. Then if the input terminals *a* and *b* of FIG. 1 are impressed with −9V and −2V respectively, the transistor 6 of the inverter circuit 2 will be turned on, at the same time the transistor 7 will be turned off, the contact X will receive an ON voltage and the contact Y will be supplied with an OFF voltage (set at −14V as indicated in FIG. 2). Accordingly, the transistor 3 of the exclusive circuit 1 will be turned on, while at the same time the transistor 4 will be turned off, and the polarity of the output signal from the output terminal S will have a level of "1." The output voltage at said output terminal S may be expressed, as shown in FIG. 2, in the form of a sum of voltage drops occurring across the drain and source of the respective transistors 6 and 3 when turned on. Referring again to FIG. 2, the voltage drop across the drain and source of the transistor 6 is −1V and that of the transistor 3 is −1V, so that the output voltage at the output terminal S is −2V.

As mentioned above, the output voltage of the subject exclusive AND/OR circuit may be expressed by the voltage drop across the drain and source of each transistor when turned on, regardless of the value of the input voltage, so that said output voltage can be kept constant.

While the voltage at the input terminal (*b*) stands at −4V, the transistor 7 remains off. But if said voltage decreases from −4V in any degree, said transistor 7 is likely to be turned on.

Now with respect to the case where, as shown in FIG. 2, the low level of the input voltage is −9V and the high level of the output voltage is −2V, let us calculate the width W and length L of the gate of the field-effect transistor 3 used in the exclusive circuit. The results may be expressed by the following equation.

$$I_d=\frac{\epsilon_{ox}\mu}{t_{ox}}\cdot\frac{W}{L}[(V_G-V_{th})(V_D-V_S)-\tfrac{1}{2}(V_D2-V_S2)] \quad (4)$$

where, $I_d$ = drain current
$\epsilon_{ox}$ = silicon oxide dielectric constant
$t_{ox}$ = silicon oxide thickness
$\mu$ = mobility of hole
$V_G$ = voltage across gate and source
$V_{th}$ = threshold voltage $V_D$ = drain voltage
$V_S$ = source voltage
Therefore, $$\frac{W}{L}=\frac{t_{ox}I_d}{\epsilon_{ox}\mu[(V_G-V_{th})(V_D-V_S)-\frac{1}{2}(V_D^2-V_S^2)]} \quad (5)$$

With the drain current $I_d$ taken to be about 0.3 ma.

$$W/L \approx 10 \quad (6)$$

The transconductance $gm$ of the transistor 3 may be determined by the following equation.

$$gm=\frac{W}{L}\cdot\frac{\epsilon_{ox}\mu}{t_{ox}}(V_G-V_{th}) \quad (7)$$

Assuming $t_{ox}$=2,500 A., then $gm$= 250 $\mu℧$.

Theoretically, $gm$ of equation (7) may be determined by differentiating $I_d$ of equation (4) by $V_G$. However, $I_d$ of equation (4) is determined in an unsaturated area, whereas $gm$ is generally determined in a saturated area, so that equation (7) can not be determined directly from equation (4).

When computed in the same way, as described above, the transconductance $gm$ of the inverter at the input stage will also have a value of 500 $\mu℧$. The transconductance $gm$ of the load MOS field-effect transistors 5, 8 and 9, when similarly computed, will have a value of about 25 $\mu℧$.

It is concluded from the aforementioned experimental consideration that provision of an inverter at the first stage of the exclusive AND/OR circuit enables a harmful effect resulting from an excess output impedance at the turn-on of a field-effect transistor to be greatly minimized.

The aforementioned arrangement has an especially favorable merit in that it eliminates the necessity of increasing the transconductance $gm$ of the MOS field-effect transistors itself used in the exclusive AND/OR circuit, or unduly raising the threshold voltage of an element connected to the output stage of said transistor and allows the output voltage always to be at a constant level even when exclusive AND/OR circuits are connected in two stages. Further, the exclusive AND/OR circuit as described above has the advantage of only requiring for its operation signals supplied to the gate of the inverter 2, namely, dispersing with any extra operating input current. Where integrated, said circuit can be reduced in its overall size because the transconductance $gm$ of the transistors involved is small, which offers a further advantage in carrying out integration to a greater extent. In addition, the exclusive AND/OR circuit is not liable in any way to have a lower switching speed.

The aforementioned embodiment involves an inverter prepared from a combination of a pair of field-effect transistors, but said inverter may instead be formed of other ordinary transistors. Further, field-effect transistors (5), (8) and (9) are provided to take care of the load associated with the exclusive AND/OR circuit. In the integration of said circuit, however, it is preferable to apply a load of linear resistance, for example, diffusion resistance.

The described embodiment of the present invention provides an exclusive AND/OR circuit having a simple arrangement using field-effect transistors, wherein the transconductance of said transistors is not increased with the resultant decrease in the area occupied by the elements used, the elements connected to the output stage of the transistors are allowed to have substantially the same threshold voltage to permit their integration even if said field-effect transistors are connected in a manner to form a plurality of stages, the input and output voltages can have a certain optimum value and moreover little extra operating input current is required.

What is claimed is:

1. An exclusive AND/OR circuit device comprising:

an exclusive AND/OR circuit element including a pair of first and second field-effect transistors having substantially the same properties, the source of each of said transistors being connected to the gate of the other of said transistors, the gates of said transistors being connected to a pair of input terminals of said exclusive AND/OR circuit element respectively, and the drains of said transistors being connected to an output terminal of said exclusive AND/OR circuit element;

an inverter having output terminals respectively connected to the input terminals of said exclusive AND/OR circuit element;

a source of power; and load elements connected between said power source and the input and output terminals, respectively, of said exclusive AND/OR circuit element.

2. An exclusive AND/OR circuit device according to claim 1 wherein said inverter comprises a pair of third and fourth field-effect transistors whose drains are respectively connected to said pair of input terminals of said exclusive AND/OR circuit element and whose sources are grounded.

3. An exclusive AND/OR circuit device according to claim 1 wherein said inverter comprises a pair of third and fourth field-effect transistors whose drains are respectively connected to said pair of input terminals of said exclusive AND/OR circuit element and whose sources are grounded, and wherein said load elements include field-effect transistors connected as loads.

4. An exclusive AND/OR circuit device according to claim 1 wherein said exclusive AND/OR circuit element is an integrated circuit element.

5. An exclusive AND/OR circuit device according to claim 1 wherein said exclusive AND/OR circuit device is an integrated circuit.